United States Patent [19]
Breternitz, Jr.

[11] Patent Number: 5,659,699
[45] Date of Patent: Aug. 19, 1997

[54] METHOD AND SYSTEM FOR MANAGING CACHE MEMORY UTILIZING MULTIPLE HASH FUNCTIONS

[75] Inventor: Mauricio Breternitz, Jr., Austin, Tex.

[73] Assignee: International Business Machines Corporation, Armonk, N.Y.

[21] Appl. No.: 353,005

[22] Filed: Dec. 9, 1994

[51] Int. Cl.$^6$ .................................................. G06F 12/10
[52] U.S. Cl. .................................. 395/421.06; 395/455
[58] Field of Search ........................... 395/455, 421.06, 395/454, 421.01

[56] References Cited

U.S. PATENT DOCUMENTS

| | | | |
|---|---|---|---|
| 5,261,064 | 11/1993 | Wyland | 395/421.01 |
| 5,509,135 | 4/1996 | Steely, Jr. | 395/474 |

*Primary Examiner*—Eddie P. Chan
*Assistant Examiner*—Kevin L. Ellis
*Attorney, Agent, or Firm*—Richard A. Henkler; Brian F. Russell; Andrew J. Dillon

[57] ABSTRACT

In a data processing system, a tag memory is divided into a first tag memory portion and a second tag memory portion. Next, an address for recalling requested data is generated by a central processing unit. Thereafter, a first and second tag memory addresses are concurrently computed, where the first and second tag memory addresses have bits which differ in value in a selected corresponding bit location. In response to the value of the bit in the selected bit location, the first tag memory address is coupled to either the first or second tag memory portion, and, concurrently, the second tag memory address is coupled to the other tag memory portion. Next, tag data is concurrently recalled from both the first and second tag memory portions utilizing the first and second tag memory addresses. A search tag is generated in response to the memory address from the CPU. Thereafter, the search tag and the recalled tag data from the first and second tag memory portions are concurrently compared. If either comparison results in a match, a "hit" is indicated. In response to the indication of a hit, requested data is recalled from the data portion of the cache memory system utilizing the recalled tag data that matched the search tag.

9 Claims, 5 Drawing Sheets

METHOD AND SYSTEM FOR MANAGING CACHE MEMORY UTILIZING MULTIPLE HASH FUNCTIONS

BACKGROUND OF THE INVENTION

1. Technical Field

The present invention relates to an improved data processing system, and in particular to a method and system for efficiently locating requested data in a cache memory system. Still more particularly, the present invention relates to a method and system for simultaneously utilizing multiple hash functions to locate requested data in a cache memory system.

2. Description of the Related Art

A cache memory is a small, fast, redundant memory used to store the most frequently accessed parts of the main memory. Cache memory provides a buffering capability by which a relatively slow and large main memory can interface to a CPU at the processor cycle time in order to optimize performance. Such system performance may be measured by the ratio of memory access time to processor cycle time. Since cache memory exploits the principle of "locality of reference," and because cache memories operate at close to processor speeds, the use of cache memory may improve overall system performance by lowering the ratio of memory access time to processor cycle time. The principle of locality of reference is based upon the observation that some memory locations are referenced much more frequently than others. By copying into cache memory a copy of data located at a location in main memory which is frequently accessed, system performance may be increased because the likelihood that the CPU must wait for access to data in main memory has decreased.

Cache memory is "associative," or "content-addressable," which means that the address of a memory location is stored, along with the content of that memory location. Rather than reading data directly from a cache memory location, the cache memory is given an address and responds by providing data which may or may not be the data that was requested. The cache then indicates that the correct data is being provided by indicating a "hit." Otherwise the cache indicates a "miss." If the cache indicates a miss, the requested data must then be recalled from main memory or from virtual memory (i.e., a hard disk drive). The performance of a cache memory system may be described by a "hit ratio," which is the number of times requested data is found in cache memory compared to the number of times the CPU requests data. The hit ratio is strongly influenced by the program being executed, but is largely independent of the ratio of cache size to memory size.

Because cache memory may only store a copy of a portion of main memory, a strategy for cache management is necessary. Cache management strategies exploit the principle of locality. Spatial locality is exploited in the choice of what data is copied into cache memory. Temporal locality is exploited in the choice of what data is deleted from cache memory. When a cache miss occurs, data processing system hardware copies into cache memory, a large, contiguous block of data that includes the data requested. Such a fixed-size region of memory, known as a cache "line" or "block," may be as small as a single word, or as large as several hundred bytes.

Cache memory often comprises two conventional memories, one known as the data memory, and one as the tag memory. The address of each cache line contained in the data memory is stored in the tag memory, as well as other information (e.g., "state" information). Each line contained in the data memory is allocated a corresponding word in the tag memory to indicate the full address of the cache line.

The requirement that the cache memory be associative complicates the design. Addressing data in memory by the content of the data is inherently more complicated than addressing the data by its address. In addressing data in cache memory, all the tags must be compared concurrently to achieve low latency. In one cache implementation, a mapping of main memory locations to cache memory locations makes the design simpler. This means that the location of data in cache is computed as a function of the main memory address for that data. Such a function for computing a location in cache may be referred to as a "hash function." Typically, a number of the low-order bits of the memory address may be selected by such a hash function.

In such "direct-mapped" caches, each memory location is mapped to a single location in the cache. This may make many aspects of the design simple, since there is no choice as to where the memory line may reside in cache, and no choice as to which line in cache will be deleted when new data is stored. However, the direct mapping may result in poor cache utilization when two memory locations are alternately accessed and must share a single area in cache. This means that multiple memory references may conflict for the same cache entry even when other cache entries are available.

Another method of implementing a cache memory is called a "set-associative cache." Set-associative caches alleviate the problem caused when two memory locations are alternately accessed and must share a single cache cell in a direct-mapped cache. An M-way set-associative cache maps each main memory location into one of M locations in the cache. This permits the cache to be constructed from M number of direct-mapped caches. However, in recalling data from cache, M caches must be searched with each memory access and the appropriate data selected and multiplexed if a match occurs. Upon the occurrence of a miss, a choice must be made regarding which of the M possible lines is to be deleted as new data is copied into the cache. The additional complexity of set-associative caches usually limits the degree (i.e., the number M) of the design. Typically, when M equals 4 or less, set-associative cache memories are still competitive, although a cycle time slower, with direct-mapped caches.

The search for data in a set associative cache location proceeds by computing the memory index as a function of the main memory address. This address is applied to all M memory arrays, and a tag comparison is performed to determine if the requested data is present in cache.

More recently, a class of direct-mapped caches known as "hash-rehash" has been developed. Hash-rehash caches are regular direct-mapped caches that select cache entries for a given memory address by using two hash functions. A first hash function is used to calculate a primary cache address for the requested data. If such a first cache address does not contain the requested data, a second hash function may then be used to calculate an alternative cache location for the requested data. Thus, requested data may be located in two different locations in cache memory as determined by the first and second hash functions.

Cache searches in a hash-rehash cache may take one or two cycles. In the case where a first hash function locates requested data in cache, requested data may be located in one cycle. If a miss occurs utilizing the first hash function, the second hash function may be utilized to locate the requested data in the cache in a second location. If the second location contains the requested data, the cache search has utilized two cycles. hash-rehash caches have been shown to match the hit ratio of a four-way set-associative cache with the same cache memory size. Access times are similar, even though hash-rehash caches may require two cycles per access. This is because misses are relatively rare events.

One problem with the prior art is that the first location in the cache, which is the result of a first hash function, is examined first, before a second hash function calculates an alternative cache location for the requested data. If the requested data is not located at the address produced by the first hash function, the cache address produced by the second hash function is then examined to determine if the requested data is present. As discussed above, the process of searching for requested data in a hash-rehash cache may require two cycles per memory request. Therefore, the problem remaining in the prior art is to provide a hash-rehash cache that allows access to tag memory for two or more hash functions during the same cycle time. If the examination of tag data resulting from tag memory access by two or more hash functions is permitted in the same cycle time, both the performance characteristics of direct-mapped caches and the higher bit ratio of set-associative caches may be obtained.

SUMMARY OF THE INVENTION

It is therefore one object of the present invention to provide an improved data processing system.

It is another object of the present invention to provide a method and system for efficiently locating requested data in a cache memory system.

It is yet another object of the present invention to provide a method and system for simultaneously utilizing multiple hash functions to locate requested data in a cache memory system.

The foregoing objects are achieved as is now described. In a data processing system, a tag memory is divided into a first tag memory portion and a second tag memory portion. Next, an address for recalling requested data is generated by a central processing unit. Thereafter, a first and second tag memory addresses are concurrently computed, where the first and second tag memory address have bits which differ in value in a selected corresponding bit location. In response to the value of the bit in the selected bit location, the first tag memory address is coupled to either the first or second tag memory portion, and, concurrently, the second tag memory address is coupled to the other tag memory portion. Next, tag data is concurrently recalled from both the first and second tag memory portions utilizing the first and second tag memory addresses. A search tag is generated in response to the memory address from the CPU. Thereafter, the search tag and the recalled tag data from the first and second tag memory portions are concurrently compared. If either comparison results in a match, a "hit" is indicated. In response to the indication of a hit, requested data is recalled from the data portion of the cache memory system utilizing the recalled tag data that matched the search tag.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
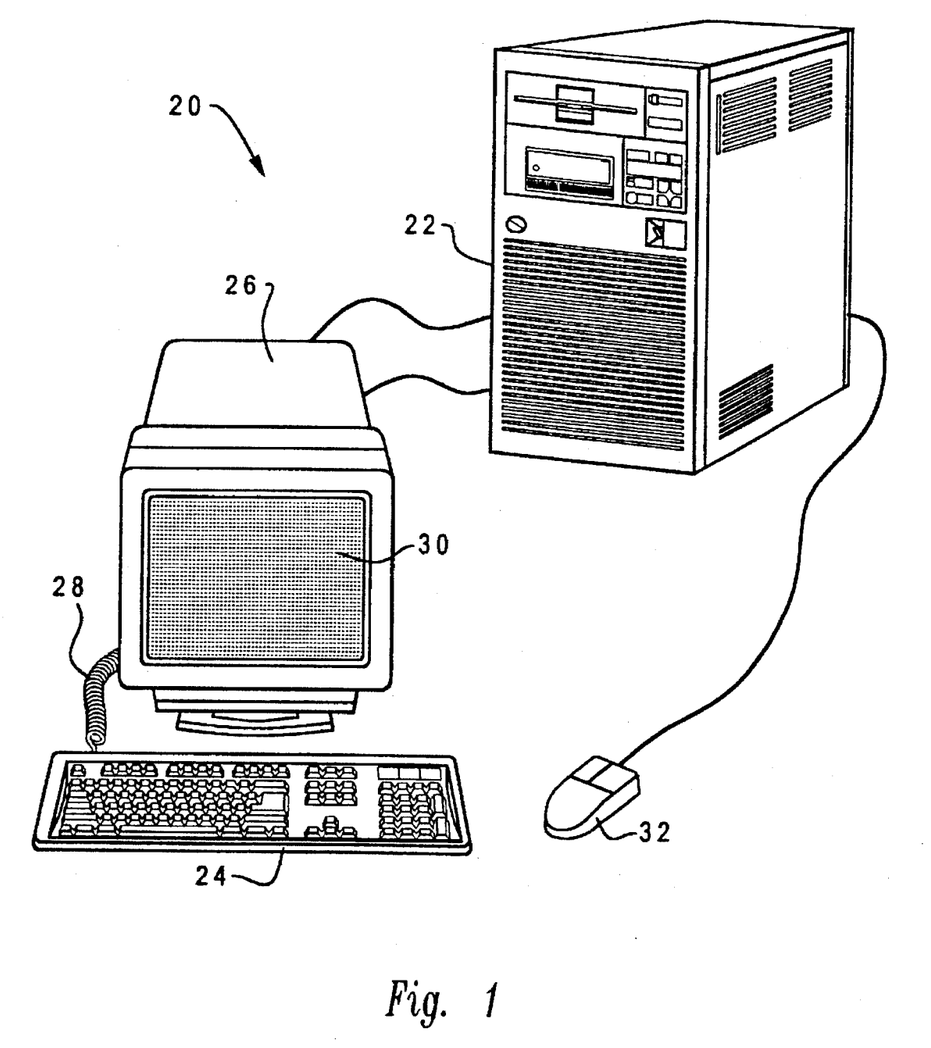
FIG. 1 depicts a data processing system which may be utilized to implement a preferred embodiment of the present invention.

With reference now to the figures and in particular with reference to FIG. 1, there is depicted a data processing system 20 which includes processor 22, keyboard 24, and display 26. Keyboard 24 is coupled to processor 22 via cable 28. Display 26 includes display screen 30, which may be implemented utilizing a cathode ray tube (CRT), a liquid crystal display (LCD), an electroluminescent panel, or the like. Data processing system 20 also includes pointing device 32 which may be implemented utilizing a track ball, joystick, touch sensitive tablet or screen, or, as illustrated in FIG. 1, a mouse. Pointing device 32 may be utilized to move a pointer or cursor on display screen 30. Processor 22 may also be coupled to one or more peripheral devices (not shown).

Those persons skilled in the art of data processing system design will recognize that display 26, keyboard 24, and pointing device 32 may each be implemented utilizing any one of several known off-the-shelf components. Data processing system 20 may be implemented utilizing any so-called "personal computer," such as the personal computer sold under the trademark "PS/2" which is manufactured and distributed by International Business Machines Corporation (IBM) of Armonk, N.Y.

Figure 2:
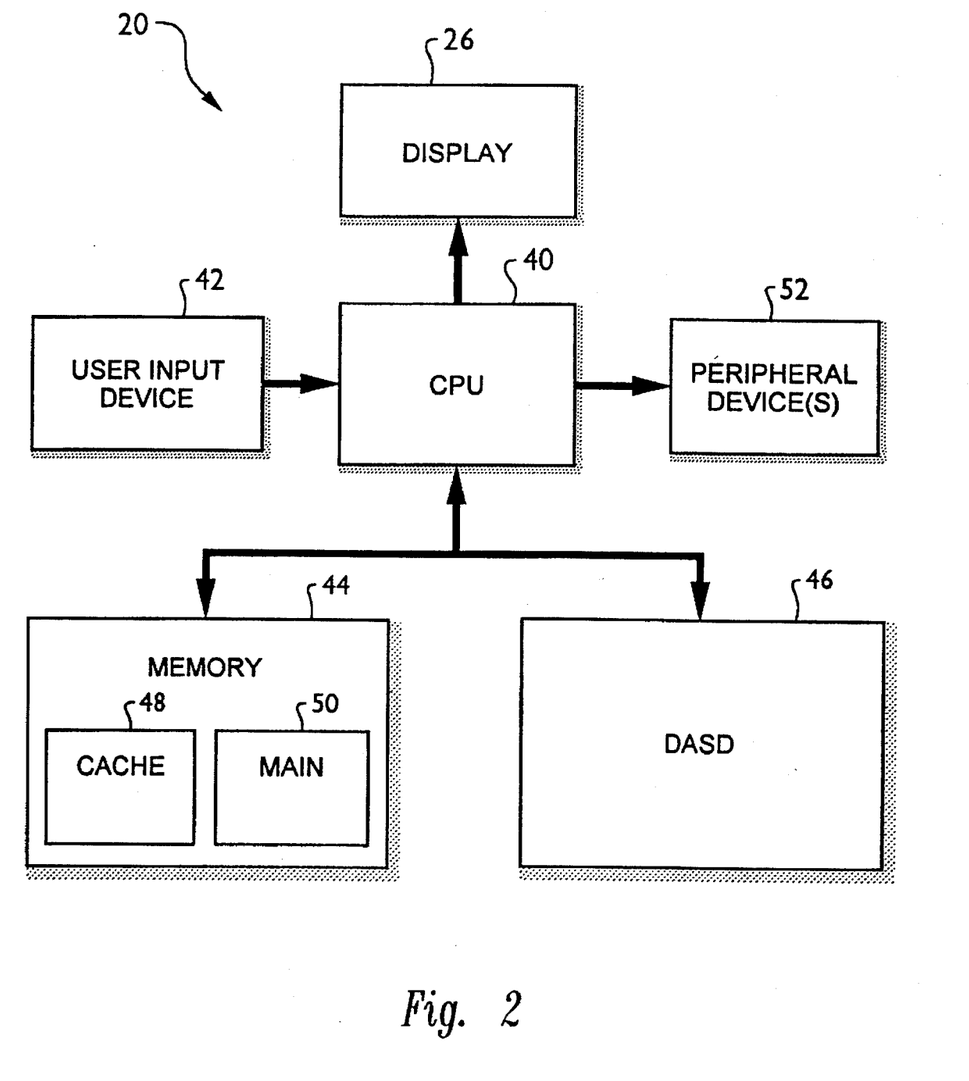
FIG. 2 is a more detailed high-level block diagram further illustrating the major components of the data processing system of FIG. 1.

With reference now to FIG. 2, there is depicted a more detailed high-level block diagram further illustrating the major components of data processing system 20 of FIG. 1. Data processing system 20 is controlled primarily by instructions, in the form of software, executed within central processing unit (CPU) 40. CPU 40 is coupled to display 26, which is utilized to display text and graphics, and possibly animated graphics or video. CPU 40 is also coupled to user input device 42, which is utilized to receive input from a data processing system user. User input device 42 may include keyboard 24 and pointing device 32, as illustrated in FIG. 1.

Memory 44 and direct access storage device (DASD) 46 are coupled to CPU 40 and may be utilized for storing application programs (i.e., software) and data sets. Memory 44 may include a cache memory 48 and a main memory 50. Cache memory 48 performs a buffering function between main memory 50 and CPU 40 in order to optimize CPU performance. Cache memory 48 is typically much smaller and faster than main memory 50. Cache memory 48 is preferably able to recall data within one cycle time of CPU 40. Cache memory 48 is utilized to store a redundant copy of the most frequently accessed portions of main memory 50.

Peripheral devices 52 may also be included in data processing system 20. Such peripheral devices may include hard disk drives, tape drives, CD-ROMs, WORM drives, communications devices, multimedia presentation devices, test equipment, and the like.

Figure 3:
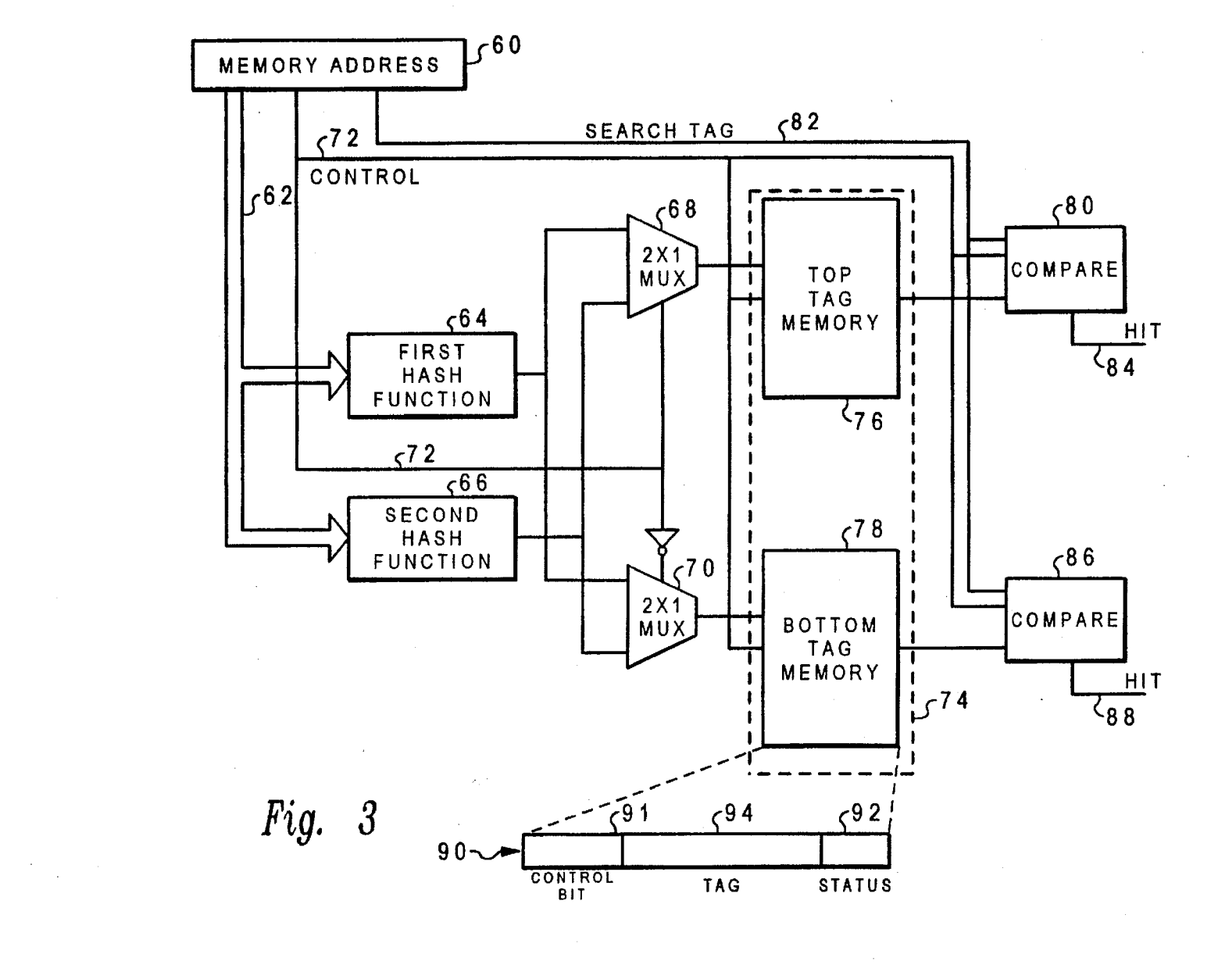
FIG. 3 depicts a high-level schematic which illustrates a portion of the interface between a CPU and a cache memory system in accordance with the method and system of the present invention.

With reference now to FIG. 3, there is depicted a high-level schematic which illustrates a portion of the interface between CPU 40 and cache memory 48. As illustrated at block 60, a memory address is generated. Typically, such a memory address is generated by a central processing unit, such as CPU 40 (see FIG. 2). Such a memory address may include 32 bits of information which specify an address in main memory from which data will be recalled and transferred to CPU 40. However, if a cache memory is utilized in data processing system 20, the requested data will be recalled from cache memory 48 if such requested data is present within cache memory 48. To determine whether requested data is stored within cache memory 48, a tag memory portion of cache memory 48 must be interrogated as discussed in greater detail below.

The memory address generated at block 60 is transferred to two circuits for performing hash functions via memory address bus 62. A first hash function is shown at block 64 and a second hash function is shown at block 66. First hash function 64 and second hash function 66 are utilized to compute the address of a location in a tag memory portion of the cache memory system based upon the input from memory address 60.

According to an important aspect of the present invention, two tag memory addresses are computed simultaneously by two different hash functions. First and second hash functions 64 and 66 each receive a main memory address 60 as an argument, and return a value for a tag memory address in the range of zero to n−1, where n is the number of cache entries. First hash function 64 and second hash function 66 are chosen so that the first hash function 64, F1 (v), returns a value i for any argument v, and the second hash function 66, F2(v) returns a value j for any argument v, such that i and j always differ with respect to a given bit value. In this example, bit 10 has been selected to be such a bit that differs between the values i and j. As described in greater detail below, such a bit that differs in value between i and j may be utilized as a control bit.

The output of first hash function 64 is coupled to two 2×1 multiplexers, illustrated as MUX 68 and MUX 70. Similarly, the output of second hash function 66 is coupled to MUX 68 and MUX 70. Control bit 72, which is a selected bit that differs in value in the outputs of first and second hash functions 64 and 66, is utilized to control the output of MUX 68 and MUX 70. Control bit 72 is coupled directly to MUX 68, while the complement of control bit 72 is coupled to MUX 70. Because of this application of control bit 72, MUX 68 and MUX 70 will never output the same hash function; if MUX 68 outputs an address computed by first hash function 64, MUX 70 will output an address computed by second hash function 66, and if MUX 68 outputs an address computed by second hash function 66, MUX 70 will output an address computed by first hash function 64.

According to an important aspect of the present invention, tag memory 74 is divided into two or more portions, as referred to, and illustrated, in this example by top tag memory 76 and bottom tag memory 78. The output of MUX 68 is coupled to top tag memory 76 and the output of MUX 70 is coupled to bottom tag memory 78. Top and bottom tag memories 76 and 78 are utilized to store "tags," as illustrated by tag 94. Such tags are comprised of data bits which partially identify an address in main memory from which data has been copied into a location in the data portion of cache memory. The data portion of the cache memory is not shown in FIG. 3. Generally, the tag is comprised of a selected number of most significant bits from the address of the requested data.

Additional data bits are also stored in conjunction with tag data in tag memory 74. As illustrated at memory location 90, control bits 91 and status bits 92 are stored together with tag 94. Control bit 91 must be stored in memory location 90 because control bit 91 completes the information necessary to detect a hit, as described below in greater detail. As is known in the art, other control bits may be stored in tag memory as well.

The output of top tag memory 76 is coupled to compare circuit 80. Also coupled to compare circuit 80 is control bit 72 and search tag 82. Search tag 82 may be comprised of a selected number of most significant bits from memory address 60. Compare circuit 80 is utilized to compare search tag 82 and control bit 72 to the output of top tag memory 76, which includes control bit 91 that was stored with the tag 94, and to determine whether or not such compare circuit inputs are the same. If such compare inputs are the same, compare circuit 80 outputs a signal indicating a hit, as illustrated at output 84.

In a similar manner, the output of bottom tag memory 78 is coupled to compare circuit 86. Compare circuit 86 compares the output of bottom tag memory 78 with search tag 82 and control bit 72, and generates an output signal in response to a determination that the two input expressions are the same. If the two input expressions input into compare circuit 86 are the same, compare circuit 86 indicates a hit at output 88.

The operation of the cache memory system depicted in FIG. 3 begins with storing information in tag memory 74 in response to data requests from CPU 40. Tag data may be stored in either top or bottom tag memories 76 or 78 at a location calculated by either first or second hash functions 64 or 66. When tag data is stored in tag memory 74 control bit 72 is stored together with tag data 94, as illustrated by control bit 91 in memory location 90. Thus, in this example, control bit 91 represents the value of control bit 72 when tag data 94 was stored in memory location 90. Other information stored in memory location 90 may included status bits 92. Such status bits may include bits indicating validity, parity, or LRU bits.

The search of cache memory according to the present invention begins with the generation of a memory address, as illustrated at block 60. Thereafter, first hash function 64 and second hash function 66 simultaneously calculate two different tag memory addresses which may be used to address two portions of tag memory 74. Control bit 72 is generated in response to memory address 60 and is utilized to control MUX 68 and MUX 70. In this example, control bit 72 is selected to be the same as the value of bit 10. Thus, if bit 10 is equal to 1, MUX 68 may select first hash function 64 to be output to top tag memory 76. Meanwhile, at MUX 70, control bit 72 is inverted by inverter 69 such that MUX 70 will output second hash function 66 to bottom tag memory 78. Thereafter, top tag memory 76 and bottom tag memory 78 output tag data (including control bit 91 which was stored when the tag data was stored) to be compared by compare circuit 80 and compare circuit 86, respectively.

Compare circuits 80 and 86 determine whether or not the outputs (including control bit 91) of top and bottom tag memories 76 and 78 are equal to search tag 82 together with control bit 72. If the output of either top or bottom tag memories 76 or 78 is equal to search tag 82 together with control bit 72, either compare circuit 80 or compare circuit 86 will indicate a hit at outputs 84 or 88, respectively. If the tag data output by top and bottom tag memories 76 and 78 are not equal to search tag 82 together with control bit 72, outputs 84 and 88 will indicate a miss.

Figure 4:
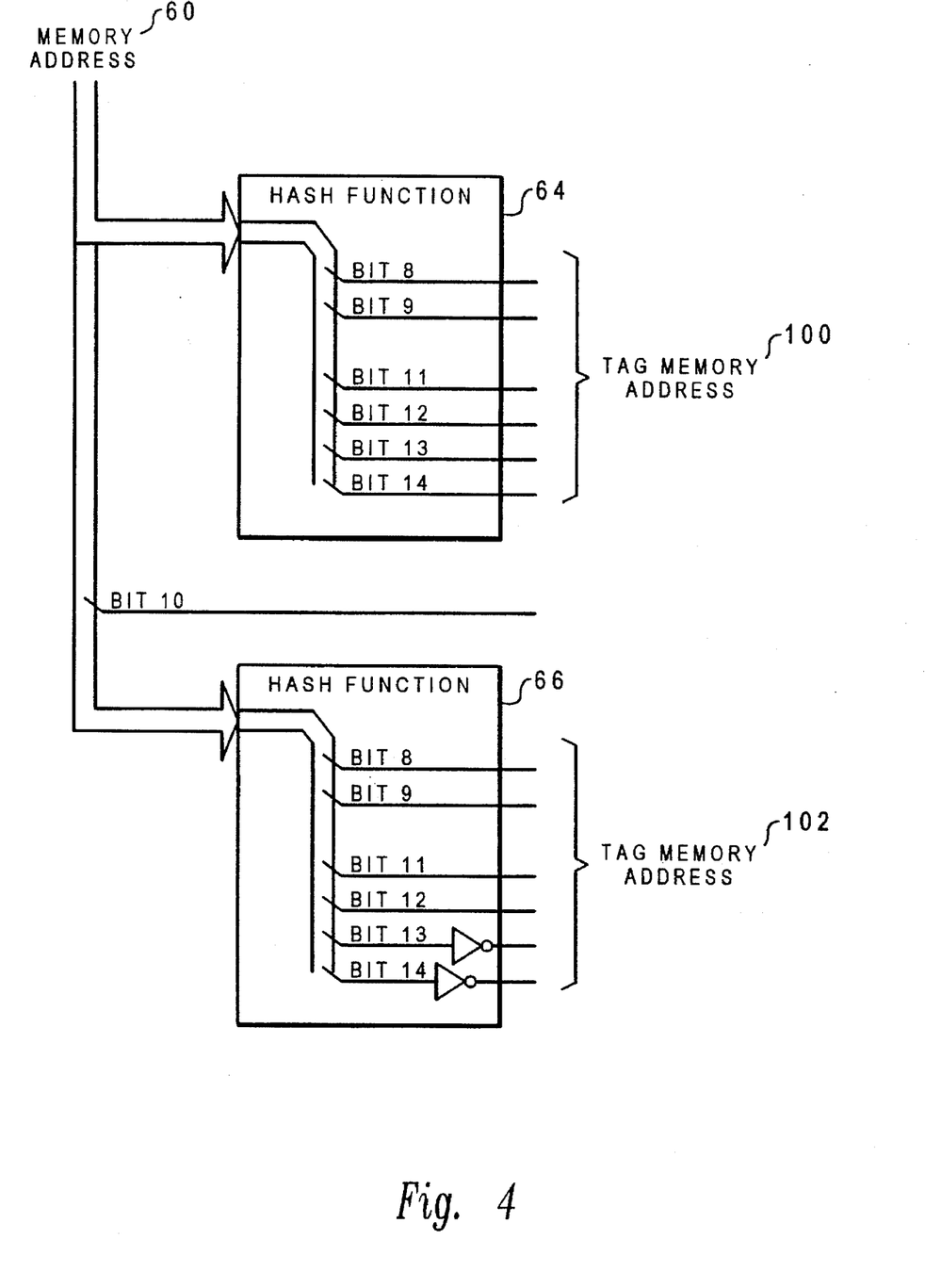
FIG. 4 is a high-level schematic of the first and second hash functions in accordance with the method and system of the present invention.

With reference now to FIG. 4, there is depicted a high-level schematic of the first and second hash functions in accordance with the method and system of the present invention. As illustrated, first hash function 64 and second hash function 66 both receive memory address 60 via memory address bus 62. Address 60 typically contains 32 bits. First hash function 64 calculates tag memory address 100 by selecting bits 8, 9, and 11–14 from address 60. Bit 10 is not included within tag memory address 100 because bit 10 has been selected, in this example, for use as control bit 72.

In a similar manner, second hash function 68 also selects bits 8, 9, and 11–14 from memory address 60. Bit 10 is not included within tag memory address 102 because bit 10 has been selected for use as control bit 72. In second hash function 66, selected bits in tag memory address 102 have been inverted to produce a different tag memory address 102. In this example, bit 13, and bit 14 have been inverted in the calculation of tag memory address 102. It is important that both first hash function 64 and second hash function 66 are calculated in a short period of time relative to the cycle time of CPU 40 (see FIG. 2). To maintain an advantage over the traditional M-way set-associative cache, the first and second hash functions 64 and 66 of the present invention must be calculated quickly. A calculation of the hash functions within one cycle time of CPU 40 (see FIG. 2) is desirable, but a calculation time comparable to traditional cache memory systems is acceptable.

Figure 5:
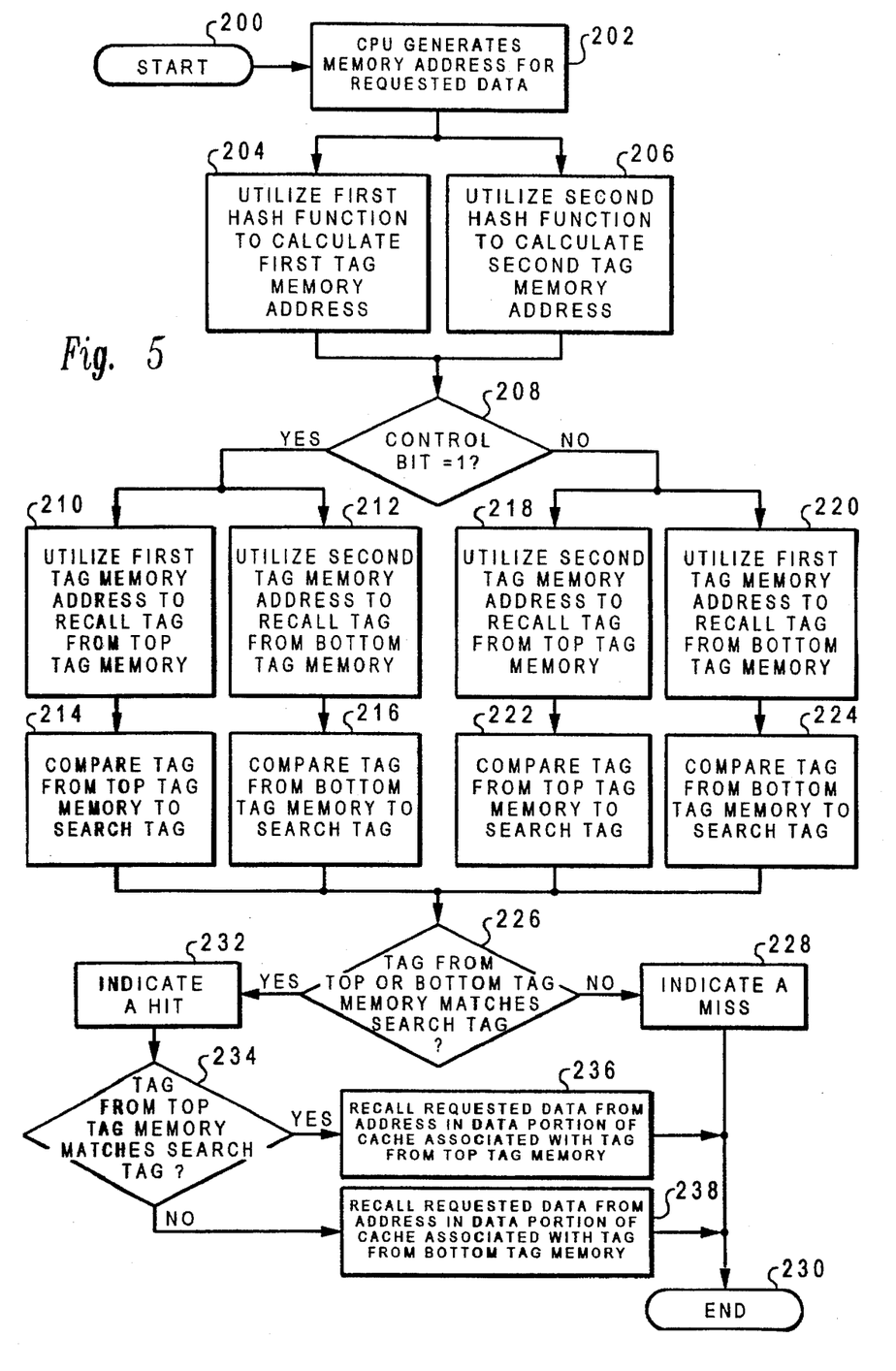
FIG. 5 depicts a high-level flowchart which illustrates the process of searching a cache memory for requested data in accordance with the method and system of the present invention.

With reference now to FIG. 5, there is depicted a high-level flowchart which illustrates the process of searching a cache memory for requested data in accordance with the method and system of the present invention. As will be appreciated by those skilled in the art, the functions shown in the flowchart are typically performed substantially simultaneously, rather than serially as suggested by the figure. As illustrated, the process begins at block 200 and thereafter passes to block 202. As illustrated at block 202, the process utilizes a central processing unit, such as CPU 40, to generate a memory address for data requested by such a CPU. An example of such a memory address is memory address 60, which may include 32 bits. Thereafter, the process utilizes a first hash function to calculate a first tag memory address as depicted at block 204. While the process is calculating such a first tag memory address at block 204, the process also utilizes a second hash function to calculate a second tag memory address as illustrated at block 206. According to an important aspect of the present invention, both the first and second hash functions concurrently calculate tag memory addresses, where such tag memory addresses are different by at least one bit from one another.

Next, the process determines whether or not a control bit, such as control bit 72 (see FIG. 3), is equal to "1," as depicted at block 208. If the control bit is equal to "1," the process concurrently sends tag memory addresses to the top and bottom tag memories (i.e., top tag memory 76 and bottom tag memory 78 in FIG. 3). As illustrated at block 210, the process utilizes the first tag memory address to recall tag data from the top tag memory. While the process accesses the top tag memory, the process also utilizes the second tag memory address to recall tag data from the bottom tag memory, as depicted at block 212. Tag data recalled from either top or bottom tag memories includes a control bit that was stored when the tag data was stored. Such a control bit indicates whether the first or second hash function was used to calculate the tag address for that particular tag data.

Once tag data has been recalled from both the top and bottom tag memories, the process compares the tag from the top tag memory to a search tag, as illustrated at block 214. Because control bit 72 is part of the memory address generated by the CPU, control bit 72 is considered part of the search tag in the step represented at block 214. Likewise, control bit 91 may be considered part of the recalled tag data, and is thus part of the comparison represented at block 214. While the process makes the comparison illustrated at block 214, the process also compares the tag from the bottom tag memory to the search tag, as depicted at block 216. In the step represented at block 216, the search tag includes control bit 72, and the recalled tag data includes control bit 91.

Referring again to block 208, if the process determines that the control bit is not equal to "1," the process utilizes the second tag memory address to recall tag data from the top tag memory, as depicted at block 218. While the top tag memory is addressed utilizing the second tag memory address, the process utilizes the first tag memory address to recall tag data from the bottom tag memory, as illustrated at block 220. As discussed previously, tag data recalled from either top or bottom tag memories includes control bit 91 which was stored with the tag data.

After tag data has been recalled from both the top and bottom tag memories, the process compares the tag data from the top tag memory to the search tag, as depicted at block 222. During such a comparison step, the process compares the tag data from the bottom tag memory to the search tag, as illustrated at block 224. As discussed previously, the search tag includes control bit 72.

After all tag data has been recalled from both top and bottom tag memories and compared to the search tag, the process determines whether or not the tag data from the top or bottom tag memory matches the search tag, as depicted at block 226. If the tag data does not match the search tag, the process indicates a cache miss, as illustrated at block 228. Thereafter, the process of searching cache memory for a requested data entry ends, as depicted at block 230.

Referring again to block 226, if the tag from the top or bottom tag memory matches the search tag, the process indicates a cache hit, as illustrated at block 232. After indicating a cache hit, the process determines whether or not the tag from the top tag memory matches the search tag, as depicted at block 234.

If the tag from the top tag memory matches the search tag, the process recalls the requested data from the address in the data portion of the cache associated with the tag from the top tag memory, as illustrated at block 236. If the tag from the top tag memory does not match the search tag the process recalls the requested data from the address in the data portion of cache associated with the tag from the bottom tag memory, as depicted at block 238. Preferably, data associated with a tag in the top tag memory is recalled from a top data portion of the cache, and data associated with a tag in the bottom tag memory is recalled from a bottom data portion of the cache. Thereafter, the process of searching cache memory for requested data ends, as depicted at block 230.

Although the invention has been described above with only two hash functions for generating two addresses for two tag memory portions, it should be apparent that additional hash functions may be utilized, and that tag memory 74 may be segmented such that additional hash functions address additional segments of tag memory.

For example, N hash functions may be used to address N portions of tag memory. Such N hash functions should be selected such that each hash function differs from all other hash functions by ($\log_2 N$) number of bits. Such ($\log_2 N$) number of bits may then be used to control an N-way multiplexer select one of the N tag memory addresses to be used in addressing one of the N portions of tag memory. Additionally, such ($\log_2 N$) number of bits must be stored with tag data in the tag portion of the cache memory system and when tag data is compared to the search tag, ($\log_2 N$) number of bits must be included with the search tag.

Those persons skilled in the art should appreciate that the present invention provides a method and system for managing cache memory which provides the speed of a direct-mapped cache while more efficiently utilizing available cache memory as a set-associative cache provides more than one memory location for data in a congruence class. The present invention is also faster than hash-rehash direct-mapped caches. Thus, the present invention provides both the performance characteristics of direct-mapped caches, and the higher hit ratio characteristics of set-associative caches.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a data processing system for managing a cache memory system, said method comprising the steps of:

dividing a tag memory portion of said cache memory system into a first tag memory portion and a second tag memory portion;

generating a memory address, including a control bit, for recalling requested data;

concurrently computing a first tag memory address and a second tag memory address in response to generating said memory address, wherein said first and second tag memory address have a plurality of bits, and wherein a selected one of said plurality of bits in a corresponding bit location in each of said first and second tag memory addresses has a value in said first tag memory address different from the value in said second tag memory address;

in response to the value of said control bit, concurrently coupling said first tag memory address to one of said first or second tag memory portions and coupling said second tag memory address to the other one of said first or second tag memory portions as a function of the corresponding coupled tag memory addresses;

concurrently recalling tag data from said first and second tag memory portions;

generating a search tag in response to generating said memory address;

concurrently comparing (a) said search tag and said recalled tag dam from said first tag memory portion, and (b) said search tag and said recalled tag data from said second tag memory portion, and indicating a hit if either comparison results in a match; and in response to said indication of a hit, recalling said requested data from a data portion of said cache memory system associated with said recalled tag data responsible for said match.

2. The method in a data processing system for managing a cache memory system according to claim 1 wherein said memory address includes address bits, and wherein said step of concurrently computing a first tag memory address and a second tag memory address in response to said memory address further includes:

selecting a plurality of address bits from said memory address to produce said first tag memory address; and inverting selected ones of said plurality of said address bits from said memory address to produce said second tag memory address.

3. The method in a data processing system for managing a cache memory system according to claim 1 wherein said tag data includes a stored control bit selected and stored with said tag data in response to the value of said selected one of said plurality of bits and wherein said step of recalling tag data from said first and second tag memory portions further includes recalling tag data from said first and second tag memory portions wherein said tag data includes said stored control bit.

4. The method in a data processing system for managing a cache memory system according to claim 1 wherein the step of concurrently coupling said first tag memory addresses to one of said first or second tag memory portions and coupling said second tag memory addresses to the other one of said first or second tag memory portions in response to the value of said control bit further includes the steps of:

coupling said first tag memory address to first inputs of first and second multiplexers, and coupling said second tag memory address to second inputs of said first and second multiplexers;

in response to said control bit being equal to one, outputting said first tag memory address at an output of said first multiplexer, and outputting said second tag memory address at an output of said second multiplexer;

in response to said control bit being equal to zero, outputting said second tag memory address at said output of said first multiplexer, and outputting said first tag memory address at said output of said second multiplexer;

coupling said output of said first multiplexer to said first tag memory portion; and coupling said output of said second multiplexer to said second tag memory portion.

5. A data processing system for managing a cache memory system comprising:

a first tag memory portion;

a second tag memory portion;

means for generating a memory address, including a control bit, for recalling requested data;

means for concurrently computing a first tag memory address and a second tag memory address in response to generating said memory address, wherein said first and second tag memory addresses have a plurality of bits, and wherein a selected one of said plurality of bits in a corresponding bit location in each of said first and second tag memory addresses has a value in said first tag memory address different from the value in said second tag memory address;

means for concurrently coupling said first tag memory address to one of said first or second tag memory portions and coupling said second tag memory address to the other one of said first or second tag memory portions, in response to the value of said control bit;

means for concurrently recalling tag data from said first and second tag memory portions as a function of the corresponding coupled tag memory address;

means for generating a search tag in response to generating said memory address;

means for concurrently comparing (a) said search tag and said recalled tag data from said first tag memory portion, and (b) said search tag and said recalled tag data from said second tag memory portion, and means for indicating a hit if either comparison results in a match; and means for recalling said requested data from a data portion of said cache memory system associated with said recalled tag data responsible for said match, in response to said indication of a hit.

6. The data processing system for managing a cache memory system according to claim 5 wherein said memory address includes address bits, and wherein said means for concurrently computing a first tag memory address and a second tag memory address in response to said memory address further includes:

means for selecting a plurality of address bits from said memory address to produce said first tag memory address; and means for inverting selected ones of said plurality of said address bits from said memory address to produce said second tag memory address.

7. The data processing system for managing a cache memory system according to claim 5 wherein said tag data includes a stored control bit selected and stored with said tag data in response to the value of said selected one of said plurality of bits and wherein said means for recalling tag data from said first and second tag memory portions further includes means for recalling tag data from said first and second tag memory portions wherein said tag data includes said stored control bit.

8. The data processing system for managing a cache memory system according to claim 5 wherein said means for concurrently coupling said first tag memory addresses to one of said first or second tag memory portions and coupling said second tag memory addresses to the other one of said first or second tag memory portions in response to the value of said control bit further includes:

means for coupling said first tag memory address to first inputs of first and second multiplexers, and means for coupling said second tag memory address to second inputs of said first and second multiplexers;

means for outputting said first tag memory address at an output of said first multiplexer, in response to said control bit being equal to one, and means for outputting said second tag memory address at an output of said second multiplexer, in response to said selected one of said plurality of bits being equal to one;

means for outputting said second tag memory address at said output of said first multiplexer, in response to said control bit being equal to zero, and means for outputting said first tag memory address at said output of said second multiplexer, in response to said selected one of said plurality of bits being equal to zero;

means for coupling said output of said first multiplexer to said first tag memory portion; and means for coupling said output of said second multiplexer to said second tag memory portion.

9. A cache memory management system in a data processing system for managing a cache memory system, said cache memory management system comprising:

a first tag memory portion and a second tag memory portion;

means for generating a memory address for recalling requested data;

a first hash function circuit, coupled to said means for generating a memory address, for performing a first hash function;

a second hash function circuit, coupled to said means for generating a memory address, for performing a second hash function;

a first multiplexer circuit having inputs coupled to said first hash function circuit and said second hash function circuit and having an output coupled to said first tag memory portion, wherein said first multiplexer circuit has a control input for receiving a first multiplexer control signal;

a second multiplexer circuit having inputs coupled to said first hash function circuit and said second hash function circuit and having an output coupled to said second tag memory portion, wherein said second multiplexer circuit has a control input for receiving a second multiplexer control signal responsive to said first multiplexer control signal;

a first compare circuit having inputs coupled to said means for generating a memory address and said first tag memory portion, and having an output for indicating a match between values at said inputs to said first compare circuit; and a second compare circuit having inputs coupled to said means for generating a memory address and said second tag memory portion, and having an output for indicating a match between values at said inputs to said second compare circuit.

* * * * *

UNITED STATES PATENT AND TRADEMARK OFFICE
CERTIFICATE OF CORRECTION

PATENT NO. : 5,659,699
DATED : August 19, 1997
INVENTOR(S) : Breternitz, Jr.

It is certified that error appears in the above-indentified patent and that said Letters Patent is hereby corrected as shown below:

Column 3, line 24: change "bit" to --hit--

Column 7, line 24: change "68" to --66--

Column 10, line 8: change "dam" to --data--

Signed and Sealed this

Ninth Day of December, 1997

*Attest:*

*Attesting Officer*

BRUCE LEHMAN

*Commissioner of Patents and Trademarks*